United States Patent
Carmel et al.

(10) Patent No.: US 7,970,739 B2
(45) Date of Patent: Jun. 28, 2011

(54) METHOD AND SYSTEM FOR MAINTAINING PROFILES OF INFORMATION CHANNELS

(75) Inventors: David Carmel, Haifa (IL); Haggai Roitman, Qiryat-Ata (IL); Elad Yom-Tov, Hamovil (IL)

(73) Assignee: International Business Machines Corporation, Armonk, NY (US)

( * ) Notice: Subject to any disclaimer, the term of this patent is extended or adjusted under 35 U.S.C. 154(b) by 503 days.

(21) Appl. No.: 12/111,972

(22) Filed: Apr. 30, 2008

(65) Prior Publication Data

US 2009/0276457 A1 Nov. 5, 2009

(51) Int. Cl.
*G06F 7/00* (2006.01)
(52) U.S. Cl. .......................................... 707/634
(58) Field of Classification Search ................ 707/634, 707/999.001
See application file for complete search history.

(56) References Cited

U.S. PATENT DOCUMENTS

| | | | |
|---|---|---|---|
| 7,099,870 B2 | 8/2006 | Hsu et al. | |
| 7,299,219 B2 | 11/2007 | Green et al. | |
| 2002/0042823 A1* | 4/2002 | DeBettencourt et al. | 709/224 |
| 2005/0198056 A1* | 9/2005 | Dumais et al. | 707/101 |
| 2006/0230055 A1 | 10/2006 | Marcjan et al. | |
| 2008/0155112 A1* | 6/2008 | Ma et al. | 709/231 |

OTHER PUBLICATIONS

"A Slacker Coherence Protocol for Pull-based Monitoring of On-line Data Sources"; Radhakrishnan Sundaresan, Tahsin Kurc, Mario Lauria, Srinivasan Parthasarathy, and Joel Saltz,; Dept. of Computer and Information Science, Dept. of Biomedical Informatics; The Ohio State University; Columbus, OH; May 14, 2003.*

* cited by examiner

*Primary Examiner* — Kimberly Lovel
*Assistant Examiner* — Mohammed R Uddin

(57) ABSTRACT

A method and system are provided for maintaining profiles of information channels available on the Web, wherein the information channels are accessed via pull-only protocols. The method includes monitoring one or more channels by a channel pull action at a monitoring rate, wherein the monitoring rate is determined for the one or more channels based on the number of update events in a previous time period. The method may optimally include filtering the update events in the time period by a novelty measure, wherein the filtering disregards events that do not include significant novel information. The monitoring rate is adapted based on reinforcement learning applying iterative learning rules over time.

18 Claims, 5 Drawing Sheets

METHOD AND SYSTEM FOR MAINTAINING PROFILES OF INFORMATION CHANNELS

FIELD OF THE INVENTION

This invention relates to the field of information management. In particular, the invention relates to maintaining profiles of information channels on the Web.

BACKGROUND OF THE INVENTION

Much of the content on the Web is available through syndication channels which need to be actively monitored to maintain an up-to-date profile of their published information over time. Such monitoring is essential for next generation of Web 2.0 applications that provide sophisticated search and discovery services over Web information channels. A channel's profile can change over time due to the dynamic nature of the channel. Therefore, maintaining a fresh channel profile is extremely difficult, especially under the constraint of a limited monitoring budget.

The number of diverse information channels available on the Web is rapidly increasing. It spans many different knowledge domains such as news, stock and market reports, auctions, and more recently channels containing data gathered from Blogs or Wikis. Recent advances in Web technology, such as the improved access capabilities to channels and the availability of new data delivery mechanisms for disseminating the channel content, have resulted in the emergence of more advanced client-side Web applications.

These applications require sophisticated manipulation of channels on the Web including the discovery, search, and recommendation of relevant channels. Such applications include various Web 2.0 mashups, and situational applications in general, which integrate data that is gathered from several different, possibly inter-related, channels. An imperative task for developers of such applications is to locate relevant channels that will maximize the benefit gained from their applications.

A crucial step toward the support of such advanced services over channels is the ability to capture the essence of each Web channel. This can be done using channel profiles. A channel profile is a compact representation of the channel content, which can be used to summarize and capture the main characteristics of the content published on this channel. Profiles can simplify the way relevant channels can be located and can be used to match application requirements against the available set of channels managed by the system.

Maintaining channel profiles is challenging due to several reasons. First, channel content is usually dynamic, as in the case of Web feeds where the content is continuously changing, sometimes at a daily or even hourly rate. Because the profiles of such channels may continually change over time, capturing the dynamic trends of the channel content is extremely difficult.

Second, the majority of channels on the Web are available nowadays for access via pull-only protocols, while most servers refrain from supporting push protocols due to scalability issues. Previous work on novelty detection in data streams, and data stream summarization, assume that the stream of updates to a channel is pushed into the system. By contrast, in a pull based scenario each channel is required to be actively monitored in order to maintain enough snapshots to construct a fresh and reliable profile of its content. The freshness of maintained profiles therefore directly depends on the rate at which channels are monitored. Moreover, different channels may have different rates at which novel content is being published on them; thus profiles of different channels may change at a different (possibly even non-regular) rate.

Third, in the pull-based scenario, channels may be volatile, meaning that novel content published over time has a limited lifespan during which it is available on the channel. Such data volatility is very common in Web feeds, where channels have a limited capacity for the number of feed entries that are maintained on the feed. Such limitation is further determined by the feed popularity and the feed provider update policy (e.g., an overwrite policy for which the provider maintains only the last newest entries of the feed). Therefore, monitoring the channel profiles in a pull setting is challenging, where it is hard to predict the moments when novel content, which may result in a significant profile change, is published on such volatile channels and is still available for access.

Finally, channel monitoring can be constrained, either due to limited system resources such as bandwidth, memory, or CPU (central processing unit), or due to monitoring restrictions set by the channel providers themselves (sometimes termed "politeness constraints") due to heavy workloads imposed by multiple client access. Therefore, the number of channels that can be monitored in parallel is further limited and requires efficient utilization of the allocated resources for the maintenance of fresh profiles.

SUMMARY OF THE INVENTION

According to a first aspect of the present invention there is provided a method for maintaining profiles of information channels available on the Web, wherein the information channels are accessed via pull-only protocols, the method comprising: monitoring one or more channels by a channel pull action at a monitoring rate, wherein the monitoring rate is determined for the one or more channels based on the number of update events in a previous time period.

Preferably, the method includes filtering the update events in the time period by a novelty measure, wherein the filtering disregards events that do not include significant novel information.

The monitoring rate may be adapted based on reinforcement learning applying iterative learning rules over time.

The filtering may determine if update events include significant novel information by evaluating an update event's influence on channel cohesion, and disregarding update events with high similarity to an information channel's current profile. The method may include setting a threshold parameter to control the amount of novelty filtering. The threshold parameter may be a similarity of an update event to the information channel's current profile, below which update events are disregarded.

The method may include monitoring multiple channels, wherein the monitoring rate is refined based on inter-channel profile similarities.

The method may further include maintaining a similarity matrix with entries corresponding to the average profile similarity between two channels during a given time period.

Where the method includes monitoring multiple channels, the M most important channels may be monitored at any moment in time, wherein the importance of a channel may be determined as a channel with a higher monitoring rate. Alternatively, M randomly selected channels may be monitored at any moment in time.

The length of the previous time period in which the update events are monitored may be varied to optimize the quality of results against resource use.

According to a second aspect of the present invention there is provided a computer software product for maintaining profiles of information channels available on the Web, wherein the information channels are accessed via pull-only protocols, the product comprising a computer-readable storage medium, storing a computer in which program comprising computer-executable instructions are stored, which instructions, when read executed by a computer, perform the following steps: monitoring one or more channels by a channel pull action at a monitoring rate, wherein the monitoring rate is determined for the one or more channels based on the number of update events in a previous time period.

According to a third aspect of the present invention there is provided a method of providing a service to a client over a network for maintaining profiles of information channels available on the Web, wherein the information channels are accessed via pull-only protocols, the service comprising: monitoring one or more channels by a channel pull action at a monitoring rate, wherein the monitoring rate is determined for the one or more channels based on the number of update events in a previous time period.

According to a fourth aspect of the present invention there is provided a system for maintaining profiles of information channels available on the Web, wherein the information channels are accessed via pull-only protocols, the system comprising: means for determining a monitoring rate for one or more channels based on a number of update events in a previous time period; and means for monitoring one or more channels by a channel pull action at a monitoring rate.

The system may include a novelty filter to filter the update events in the time period, wherein the novelty filter disregards events that do not include significant novel information. The system may further include means for setting a threshold parameter to control the amount of novelty filtering.

The means for determining a monitoring rate may include a reinforcement learning mechanism to apply iterative learning rules over time.

The means for monitoring may include monitoring multiple channels, wherein the means for determining the monitoring rate includes means for refinement based on inter-channel profile similarities. The means for monitoring may include monitoring multiple channels wherein the M most important channels are monitored at any moment in time, wherein the importance of a channel is determined as a channel with a higher monitoring rate. Alternatively, M randomly selected channels may be monitored at any moment in time.

The system may include means for varying the length of the previous time period in which the update events are monitored to optimize the quality of results against resource use.

Most current Web monitoring solutions derive monitoring rates based solely on the "raw" update rates of Web channels. Thus, such solutions may consume superfluous resources and, therefore, may fail to scale.

The present described method considers also the rate of content change published on these channels to improve the monitoring policy. For this purpose, a learning scheme is suggested based on novelty detection for Web channels in pull-only settings. More specifically, some of the contributions can be stated as follows.

A profiling model for channel content is described that can be used for channel search and discovery.

The problem of maintaining dynamic profiles of channels' content is formally defined. Several evaluation measures are provided for those profiles quality.

Using the proposed measures, solutions are explored for channel profile maintenance and efficient and effective monitoring policies are proposed for a single channel as well as for multi-channel monitoring. The described policies continuously decide which channels to monitor over time, considering both the update rate as well as the novel content rate of the channels data. The channel monitoring rates are further refined by utilizing inter-channel profile similarities.

By taking the content update rate of the channels into consideration, it is possible to significantly save the monitoring resources required by the policy while maintaining a high profile quality.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Figure 1:
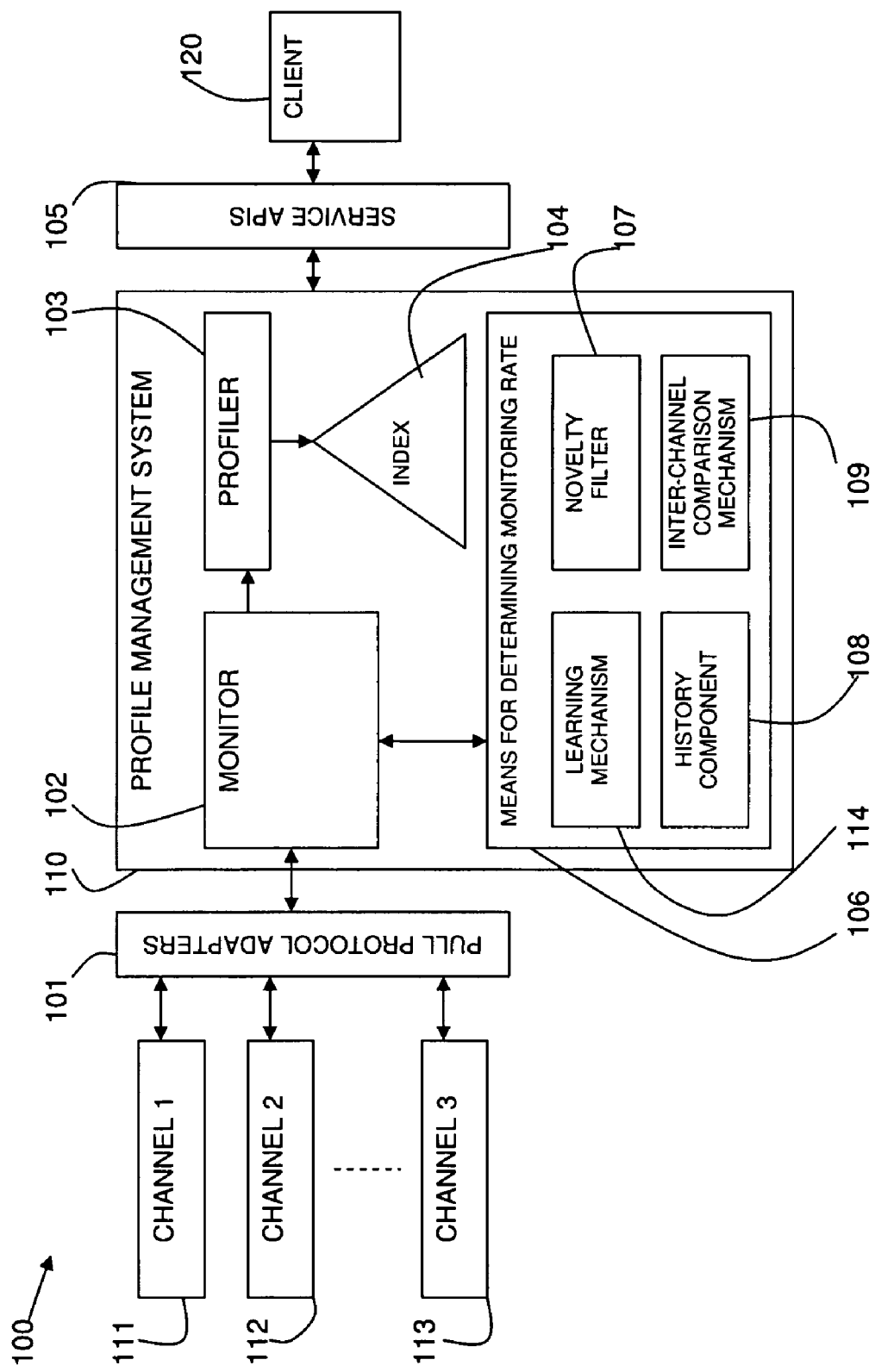
FIG. 1 is a block diagram of a system in accordance with the present invention.

Referring to FIG. 1, an example embodiment is shown of a system 100 for application of a profile management system 110 for Web channels. FIG. 1 illustrates the architecture of such a system 100 shown as monitoring multiple channels 111, 112, 113 for a client 120.

The system 100 includes: pull protocol adapters 101; a profile management system 110; and a service application programming interface (API) 105. The profile management system 110 monitors channels 111-113 and accesses the content published on the channels 111-113 using the pull protocol adapters 101 (e.g., using HTTP (Hypertext Transfer Protocol) GET calls).

The profile management system 110 includes a monitor 102, a profiler 103, and a search index 104. The profile management system 110 also includes a means for determining a monitoring rate 106 for applying the methods as described in detail. The means for determining the monitoring rate 106 may include a learning mechanism 114 and a history component 108 which is updated after every monitoring probe as described further below. The means for determining the monitoring rate 106 may also include an optional novelty filter 107 and an optional inter-channel comparison mechanism 109 if more than one channel is monitored.

In the profile management system 110, the content gathered by the monitor 102 is delivered to the profiler 103 that is responsible for updating the channel profile and generating a fresh profile for the channel's content. The profile is then updated in the search index 104. The profile management system 110 exposes a convenient service API 105 for clients 120 to search and locate relevant channels 111-113 for their application needs.

The profile management system 110 can further match the client 120 requirements (which might also be submitted as a user-profile to the system) against the current channel profiles available in the system to recommend relevant channels that can satisfy the client's needs.

A mashup application is a web application that combines data from more than one source into a single integrated tool. Clients 120 of a profile management system 110 may consist of various mashup applications that need to discover the most relevant channels to be used as inputs and outputs of the different mashup components. Other clients 120 may consist of different Web feed readers that search for relevant feeds according to their user profile, which describes the user's information interests. Moreover, the profile management system 110 can recommend new sources for clients 120, helping them discover new relevant channels that they would not be aware of otherwise.

The monitor 101 of the profile management system 110 has a limited amount of available resources for the task of maintaining fresh channel profiles; thus, it is required to monitor the channels 111-113 efficiently to maximize system capability and cope with the management of multiple channels. To do so, the monitor 101 uses the means for determining the monitoring rate 106 to set the rate at which each channel 111-113 should be monitored and how to schedule the limited allocated monitoring system resources in the most efficient way. In what follows, monitoring policies are described tailored for this specific task, i.e., maintaining good representative channel profiles that best reflect the channel content, under the constraints of limited computational resources.

Figure 2:
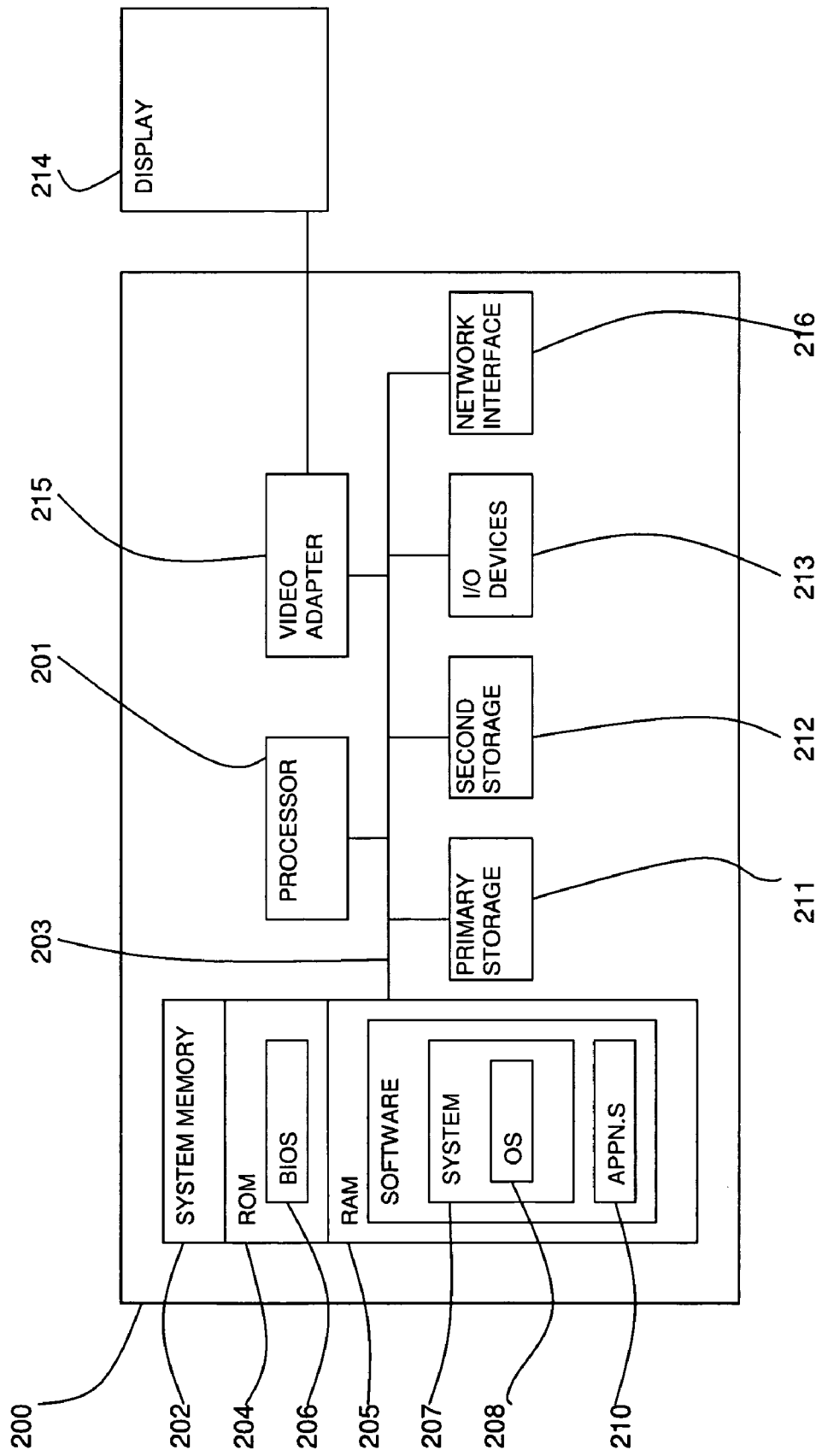
FIG. 2 is a block diagram of a computer system in which the present invention may be implemented.

Referring to FIG. 2, an exemplary system for implementing a profile management system 110 as shown in FIG. 1 includes a data processing system 200 suitable for storing and/or executing program code including at least one processor 201 coupled directly or indirectly to memory elements through a bus system 203. The memory elements can include local memory employed during actual execution of the program code, bulk storage, and cache memories which provide temporary storage of at least some program code in order to reduce the number of times code must be retrieved from bulk storage during execution.

The memory elements may include system memory 202 in the form of read only memory (ROM) 204 and random access memory (RAM) 205. A basic input/output system (BIOS) 206 may be stored in ROM 204. System software 207 may be stored in RAM 205 including operating system software 208. Software applications 210 may also be stored in RAM 205.

The system 200 may also include a primary storage means 211 such as a magnetic hard disk drive and secondary storage means 212 such as a magnetic disc drive and an optical disc drive. The drives and their associated computer-readable media provide non-volatile storage of computer-executable instructions, data structures, program modules and other data for the system 200. Software applications may be stored on the primary and secondary storage means 211, 212 as well as the system memory 202.

The computing system 200 may operate in a networked environment using logical connections to one or more remote computers via a network adapter 216.

Input/output devices 213 can be coupled to the system either directly or through intervening I/O controllers. A user may enter commands and information into the system 200 through input devices such as a keyboard, pointing device, or other input devices (for example, microphone, joy stick, game pad, satellite dish, scanner, or the like). Output devices may include speakers, printers, etc. A display device 214 is also connected to system bus 203 via an interface, such as video adapter 215.

In this section definitions for the main concepts are provided.

Web Channels

Let T represent an epoch of time, and let $T \epsilon T$ denote a time moment in T. Denote $C=\{C_1, C_2, \ldots, C_n\}$ a set of n channels, where each channel $C \epsilon C$ is defined as an infinite stream of update events $C=(e_1, e_2, \ldots)$, starting from the beginning of epoch T. Assume textual streams, where each update event $e \epsilon C$ contains a text message. Further denote life(e) the period of time during T on which update event e is available on the channel.

For a given time $T \epsilon T$, and a channel $C \epsilon C$, a channel snapshot at time T (denoted $C_T$) is given by the set of update events available on the channel at time T; that is:

$$C_T = \{e | e \epsilon C \wedge (T \epsilon \text{life}(e))\}$$

Let W be a time window in $T^2$. Given a channel $C \epsilon C$, further denote $C_W$ the union of channel snapshots during the time window W:

$$C_W = \cup_{T \epsilon w} C_T$$

Channel Profiles

A channel profile represents the textual content of the channel events belonging to the channel snapshot $C_T$. Due to the dynamic nature of channels, channel snapshots captured during different times may differ, resulting in a possible difference in the corresponding channel profiles.

In this work, the Bag Of Words (BOW) model is adopted for representing the channel content. Given a vocabulary of terms $D=\{t_1, t_2, \ldots, t_m\}$, the channel profile, at given time T, is then defined as a weight vector:

$$P(C_T) = (w_{t_1}, w_{t_2}, \ldots, w_{t_m})$$

Each weight $w_t$ corresponds to a unique term $t \epsilon D$, which may appear in the textual content of the channel events. If $C_T$ content does not contain term t, then $w_t = 0$. Each term can be either a word, a phrase, or a lexical affinity.

Similarly, given a window W of k last events captured on the channel (i.e., a window of size k), define $P(C_W)$ as the profile representing the content of those events.

The channel profile is therefore a compact representation of the channel content at a given time and is used to capture the relative importance of each of the terms in the channel at time T (or during a time window W).

An increase in profile window size results in more content that is accumulated over a longer period of time, and therefore, it may require more resources such as in-memory. Furthermore, the profile window size has an important role from a user's point of view. A user that prefers generality (i.e., a wide perspective of the content published on the channel for a long time) would require a large window size to satisfy these needs. On the other hand, a user that prefers specificity (i.e., a narrow perspective of the current content published on the channel) would require a small window size.

Web Feed Profiles

Web feeds are usually used by content providers to publish content on the Web. Those feeds are dynamic channels, supported by pull-only protocols (e.g., available for access through HTTP GET calls), where the set of published items on each feed changes over time and items are volatile in most cases.

A Web feed, such as RSS (Really Simple Syndication) or Atom feed, is an XML (Extensible Markup Language) file that contains a set of feed items, where each item links to some Web resource (e.g., an HTML (HyperText Markup Language) file), and contains summarized details of the resource such as title and description. The items that are published on the feed over time comprise the dynamic feed channel. Therefore, every new item published on feed C is treated as an update event e∈C. The set of terms appearing in the item text (title and description) comprise the item bag of terms, B(e).

The terms' weights in a Web feed profile are determined using the well-known tf-idf weighting scheme. Given $C_W$, the set of items that are available on feed C during the time window W, the term frequency of a term t, tf (t, $C_W$), is the number of occurrences of t in $C_W$. To calculate the inverse document frequency of a term t, idf(t), first count all items gathered from the feeds C∈C, from the beginning of the epoch until the end of the time window W, denoted $C_W(T)$. Then count the number of items in $C_W(T)$ that include at least one occurrence of term t, $C_W^t(T)$. Then the idf of term t is calculated by:

$$idf(t) = \log\left(\frac{|C_W(T)|}{|C_W^t(T)|}\right)$$

Finally, the weight of each term t in the profile $P(C_W)$ is given by $w_t = tf(t, C_W) \cdot idf(t)$.

While the tf of a given term t in the profile represents a the temporary local importance of the term in the channel during the given time window, the idf of a term represents its global importance by considering also the occurrence of the term in items that appeared on the different channels during the history. Since channel profiles are used to represent the dynamic textual content of the channel, common terms appearing in many channel items are less important in representing the channel content in a given time frame. Therefore, common terms (with low idf value) will be weighted lower compared to the rarest terms.

Measures

Two measures are defined over channel profiles. The first is a profile similarity, which is used to evaluate the similarity between two channel profiles. The profile similarity will be used to evaluate how the channel content is changed over time, by measuring the difference between channel profiles in different time periods. The second is a channel cohesion measure that further can be used to compare different channels with regard to the average rate of change of their content over time.

Profile Similarity

Given a pair of channel profiles $P_1, P_2$, define the similarity between the two profiles as their vector space model cosine similarity:

$$sim(P_1, P_2) = \frac{P_1 \cdot P_2}{\|P_1\| \cdot \|P_2\|} \quad (1)$$

It is worth noting that the similarity between profiles of the same channel in two different time windows reflects the amount of changes in content of the channel over time.

Channel Cohesion

Channel cohesion measures the cohesion of the textual content in the channel over time. A channel with a low cohesion is one for which new published events dynamically change the channel content as reflected by the corresponding channel profile. Such a low cohesive channel will require a higher monitoring rate in order to keep its profile up to date.

A higher cohesive channel is one where new items cause only minor change in its profile. This is typical of channels with many duplicate (or near duplicate) items or when items are focused on the same topic for a long period of time. For such channels, a low monitoring rate will suffice.

DEFINITION 1 (CHANNEL COHESION). Given a channel C∈C, the channel cohesion during the epoch $T=[T_1, T_2]$ is calculated as:

$$coh(C, T) = \frac{1}{T_2 - T_1} \int_{T_1}^{T_2} sim(P(C_T), P(C_{T+dT})) dT \quad (2)$$

Channel cohesion measures the average profile similarity in a given time period $[T_1, T_2]$. If the channel profiles significantly differ over the time period, the cohesion will be low. In practice, one can approximate the cohesion metric to measure the relative profile change per update event. Given N update events that occurred during epoch T, and assuming that the initial profile is empty (all terms weights are zero), Equation 2 is modified to:

$$coh(C, T) = \frac{1}{N} \sum_{i=1}^{N} sim(P(C_{W_{i-1}}), P(C_{W_i})) \quad (3)$$

where $C_{Wi-1}$ is the channel without event $e_i$ and $C_{Wi}$ is the channel after adding event $e_i$.

Channel Monitoring Policy

A monitoring policy's task is to maintain accurate channel profiles by deciding which channels to probe at any given time. A probe is a channel pull action. A channel monitoring task is considered to consist of several costs such as opening a TCP/IP connection to the Web channel provider, capturing its current snapshot by downloading its content, refreshing the channel profile, and updating the index. A constrained monitoring setting is assumed where the monitoring policy is allowed to probe up to M≤n channels in parallel at each time T∈T. The policy objective is therefore to maximize the quality of the channel profiles by selecting which M channels to probe at any given time, under the defined constrained setting.

Monitoring Quality

Given a channel C∈C, denote the optimal profile at time T∈T, $P^{opt}(C_T)$ as the profile obtained by monitoring the channel after each update event in the channel. Given a channel monitoring policy pol, further denote $P^{pol}(C_T)$ as the profile obtained by the monitoring policy at time T, which in general will be sub-optimal due to some missing non-monitored events caused by policy decisions. The profile monitoring quality obtained by policy pol over the set of channels C, is given by:

$$Q(C, pol) = \frac{1}{n} \sum_{C \in \mathcal{C}} \left[ \frac{1}{|T|} \int_{T \in \mathcal{T}} sim(P^{opt}(C_T), P^{pol}(C_T)) dT \right] \quad (4)$$

This quality measure provides an indication of how good the policy pol is with respect to the optimal policy. It measures the average similarity between the optimal profiles obtained by the optimal policy, to the profiles obtained by pol, over time and over the full set of channels.

Single Channel Monitoring

This section describes the proposed framework for single channel monitoring. In this simplified case, the number of channels to monitor by the policy, in Equation 4, is reduced to n=1.

Off-line and on-line channel monitoring is distinguished. In the off-line case a policy is applied that monitors the channel in a uniform monitoring rate with respect to the average update rate of the channel.

For the on-line case an adaptive learning scheme is provided to derive the channel update rate, which is used to derive a monitoring rate as in the off-line case. Experimentally, it can be shown how the effectiveness of the learning scheme converges to the same uniform monitoring rate as determined in the off-line case.

The policy is further extended to consider the content published on the channel. This extension estimates the rate of novel update events that appear on the channel. This work shows that monitoring based on the novel update rate provides a high quality channel profile with significant reduction in the system resources required for the monitoring task.

Figure 3:
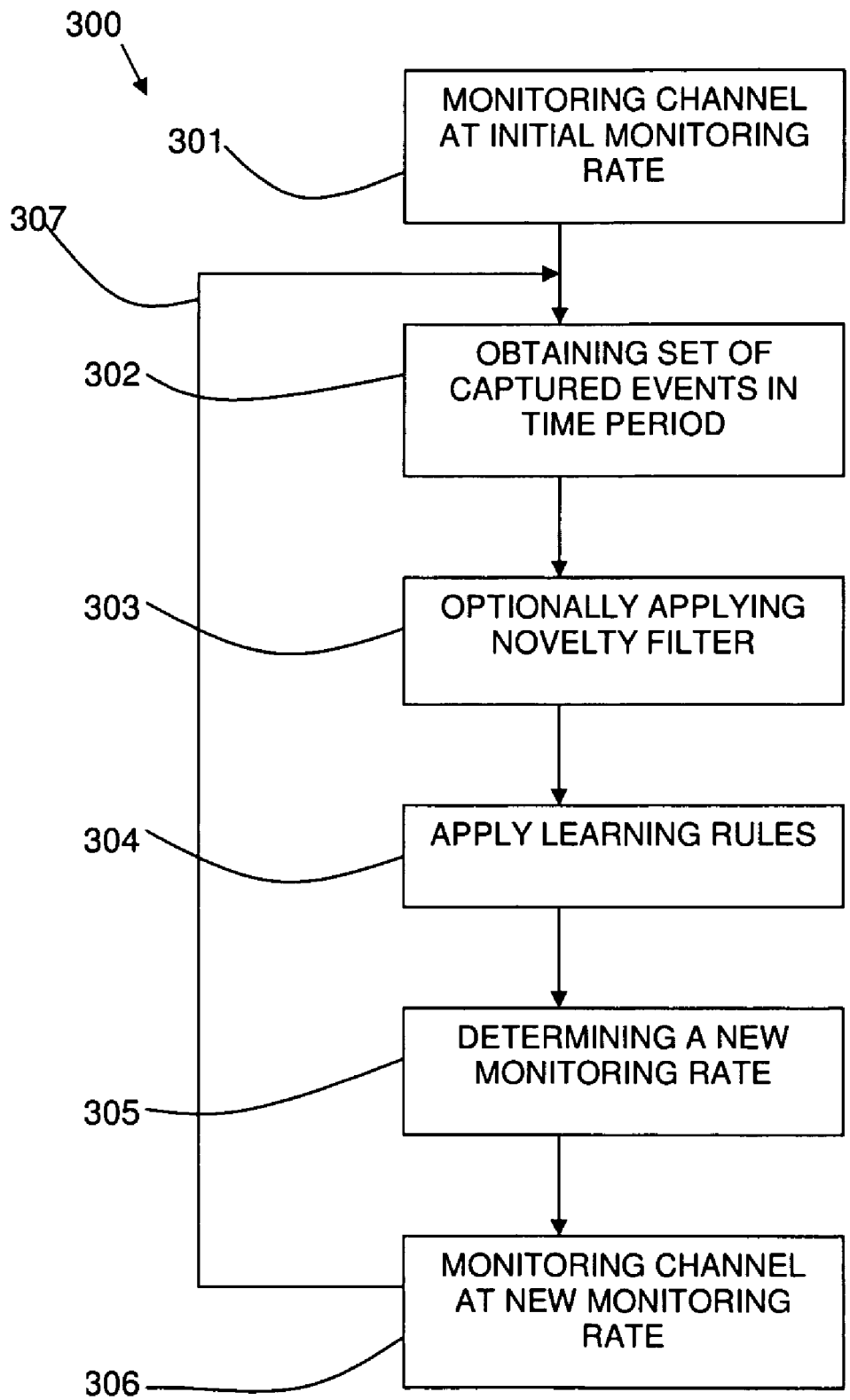
FIG. 3 is a flow diagram of a method in accordance with the present invention.

Referring to FIG. 3, a flow diagram 300 shows the general method of determining a channel monitoring rate. Monitoring of a channel is carried out at an initial monitoring rate 301, and a set of captured update events to the channel is obtained and recorded in a time interval 302. Optionally, a novelty filtering is applied 303 to the set of events to filter out the events which provide a significant novel content to the channel. Learning rules are applied 304 to the monitoring rate based on the set of captured update events and a new monitoring rate is determined 305. Monitoring of the channel is then carried out at the new monitoring rate 306. The method loops 307 and the new monitoring rate is used in the next cycle. A method of determining a channel monitoring rate may be applied to more than one channel in parallel.

Off-Line Monitoring

In the case of off-line monitoring for a given channel $C \in \mathcal{C}$, the set of all update events $e \in C$ and their corresponding content is known in advance for a given epoch T. This mode is, of course, only possible in retrospect. In practice, only the on-line case is a realistic one, for which the set of update events is unknown in advance.

Let $\theta_C(T)$ denote the update rate for channel C at time $T \in \mathcal{T}$ and let $\lambda_C(T)$ denote the monitoring rate of channel C at that same time. The off-line monitoring rate of channel $C \in \mathcal{C}$ is derived as the average update rate in the epoch T. That is, given that channel C has N update events during T, then for each time $T \in \mathcal{T}$ the off-line monitoring rate is determined as the uniform rate $$\lambda_C^{off}(T) = \frac{N}{|T|}.$$

It is worth noting that the off-line (uniform) monitoring rate $\lambda_C^{off}(T)$ serves as a first order approximation to the real (non-uniform) update rate of the channel $\theta_C(T)$.

On-Line Monitoring

In the on-line case, due to the volatile nature of the channels (and especially in the case of Web feeds), the rate at which we monitor the channel determines how many update events may be captured. With limited system resources for channel monitoring, the monitoring rate should be selected wisely—maximizing the profile quality while minimizing the monitoring rate.

In on-line monitoring, the next monitoring time is derived from the current on-line monitoring rate. Denote $T_{prev}$ the last time that the channel was monitored and $\lambda_C^{on}(T_{prev})$ be the current online monitoring rate. Thus, choose to monitor the channel again at time $$T = T_{prev} + \frac{1}{\lambda_C^{on}(T_{prev})}.$$

Learning Online Monitoring Rate

An adaptive scheme is provided based on Reinforcement Learning for deriving the monitoring rate of a channel. For this purpose we use Boltzman Learning.

Equation 5 provides the iterative learning rules that we use, assuming that the learning process starts at the beginning of epoch T. Let $\lambda_C^{on}(0) = \lambda_0$ be the initial monitoring rate, selected arbitrarily, and let $T_{prev} = 0$ denote the beginning time of epoch T. Let $C_{W'}$ denote the set of captured update events between two consecutive probes to channel C that occurred at times $T_{prev}$ and T respectively, where define $W' = [T_{prev}, T]$ and $|W'| = (T - T_{prev})$. Then the learning rule is given $$\lambda_C^{on}(T) = \alpha_T \cdot \lambda_C^{on}(T_{prev}) + (1 - \alpha_T) \cdot \frac{|C_{W'}|}{|W'|} \quad (5)$$

$$\alpha_T = \alpha_0 \cdot \exp^{\frac{-T}{G}}$$

$\alpha_T$ is a learning parameter that controls the tradeoff between the amount of exploitation and exploration of the learning process. The larger $\alpha_T$ is, the more the current monitoring rate $\lambda_C^{on}(T_{prev})$ is relied upon learned from history (exploitation) and the less the (local) observed rate (exploration) is relied upon. The G parameter controls the rate of learning where larger values imply a slower learning process. For experiments $\alpha_0 = 0.1$ and $G = 100$, chosen by trial and error using the full set of Web feeds.

Experiments demonstrate that the on-line monitoring rate, as learned by the learning scheme, converges to the off-line monitoring rate.

Note that the off-line rate expresses the average rate of updates on the channel, while the on-line rate continuously adapts to the dynamic update rate of the channel. When the update rate is changed over time, the on-line rate will adapt to those changes in a local manner.

Channel Monitoring Based on Novelty Detection

A channel monitoring scheme is now described based on novelty detection. The idea behind this scheme is based on the observation that many new events are redundant in terms of providing novel information and do not cause any significant change to the channel profile. Moreover, the rate of new novel events differs from channel to channel therefore it is beneficial to learn the update rate of novel events and then use it as the monitoring rate for the channel. Since novel update rate is usually smaller than the complete update rate, and since a policy based on the novel update rate is expected to provide high quality channel profiles, valuable system resources can be saved.

Novelty Detection Scheme

The described novelty detection scheme works as follows. Similarly to the Learning On-line Monitoring Rate, let $C_{W''}$ denote an ordered set of captured update events between two consecutive probes to channel C that occurred at times $T_{prev}$ and T respectively (hence, $W'=[T_{prev}, T]$). Furthermore, let coh(C, T) be the cohesion calculated given the last N captured events on the channel up to time $T \in T$, as determined by Equation 3. First calculate for each event $e_i \in C_{W''}$ its marginal influence on the channel cohesion, given by:

$$\Delta_{e_i} coh(C,T) = sim(P(C_{W_{i-1}}), (C_{W_i}))$$

Further determine the standard deviation of the channel cohesion using the following unbiased estimator:

$$\sigma_{coh}(C, T) = \sqrt{\frac{1}{N-1} \sum_{i=1}^{N} (\Delta_{e_i} coh(C, T) - coh(C, T))^2} \quad (6)$$

Then, disregard any event $e_i \in C_{W''}$ if its similarity to the current profile is high. That is:

$$\Delta_{e_i} coh(C,T) \geq coh(C,T) + \beta \cdot \sigma_{coh}(C,T) \quad (7)$$

Otherwise, the event is considered novel following its dissimilarity to the channel profile and its potential for significant influence on the profile.

Let $C_{W''}^{now}$ denote the set of remaining detected novel events that pass the novelty filter.

The parameter β is a threshold parameter that is used to control the amount of filtering for novelty detection. It controls the tradeoff between monitoring rate and profile quality. A high β means low filtering—most events will be considered novel. Conversely, a low β will cause only a few events to be considered as novel, but this will, in turn, cause insufficient monitoring followed by degradation in channel quality.

Applying Novelty Detection for Monitoring

Using the novelty detection filter for off-line monitoring is straightforward—apply the filter on the complete set of events and calculate the off-line monitoring rate while considering only novel events.

Figure 4:
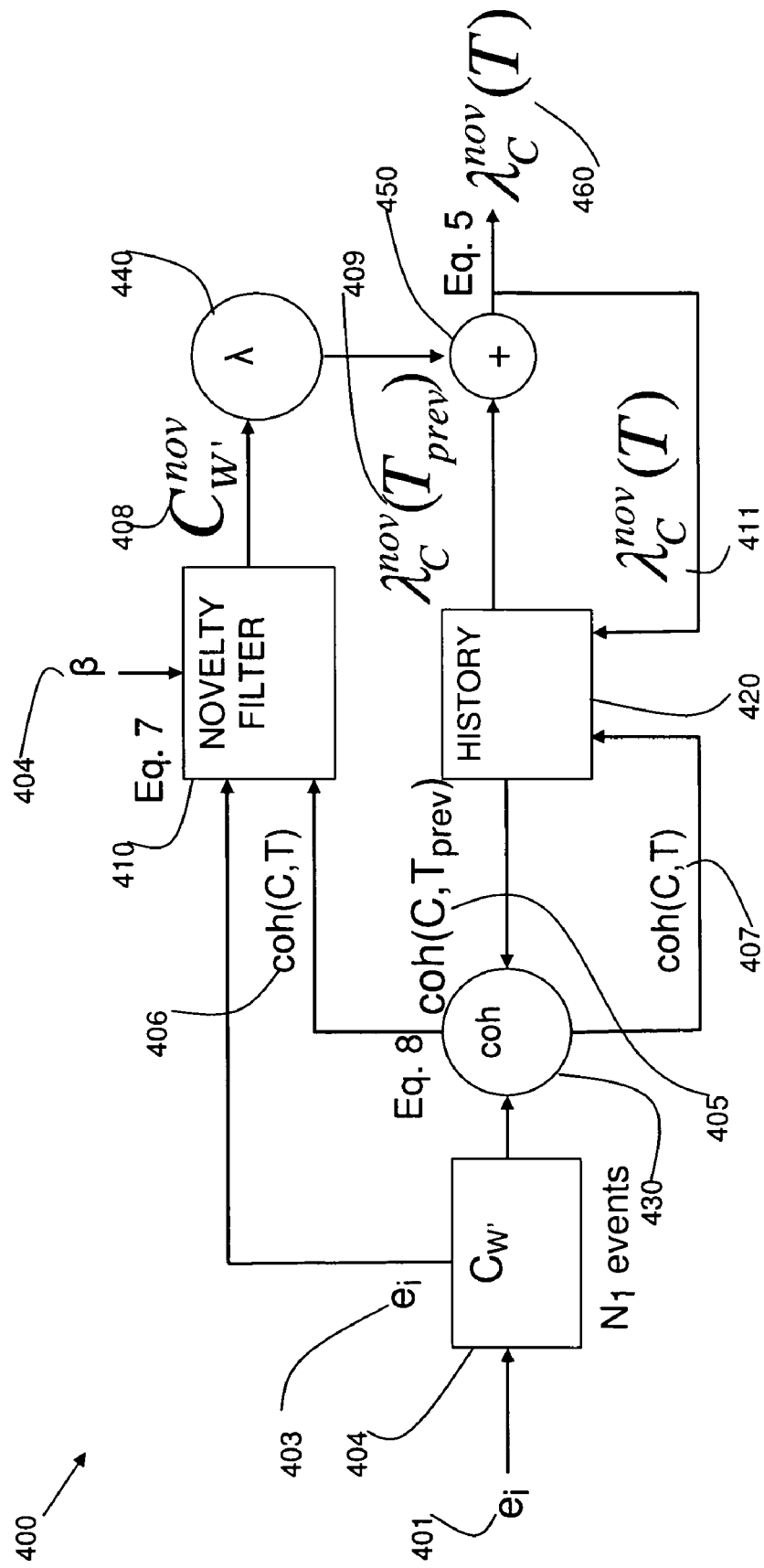
FIG. 4 is a flow diagram of a method of filtering in accordance with an aspect of the present invention.

In the on-line case, FIG. 4 shows a flow diagram of the process of updating the on-line monitoring rate using the novelty detection filter. The different equations involved in the calculation are also given next to their relevant components.

Starting from the leftmost component, update events $e_i$ 401 are captured and suppose that $N_1$ new update events are captured between two consecutive monitoring times $T_{prev}$ and T, which are kept in the buffer $C_{W''}$ 402 in FIG. 4. The update events $e_i$ are input 403 into a novelty filter 410. The novelty filter 420 also has an input 404 of the parameter β to control the amount of filtering.

Further, suppose that prior to time T a total of $N_2$ events were captured, thus resulting in a total of $N=N_1+N_2$ events at time T. Then, update Equation 3 to maintain the channel cohesion value on-line:

$$coh(C, T) = \frac{1}{N} \left[ N_2 \cdot coh(C, T_{prev}) + \sum_{i=N_2+1}^{N} sim(P(C_{W_{i-1}}), (C_{W_i})) \right] \quad (8)$$

A history component 420 maintains both the last calculated channel cohesion value and the novel monitoring rate, and is updated after every monitoring probe. The coh(C, $T_{prev}$) value 405 is taken from the history component 420 and a cohesion calculator 430 calculates the new cohesion value which is input 406 to the novelty filter 410 and input 407 to the history component 420.

The novelty filter 410 uses the previous and the new cohesion values to calculate the standard deviation of the channel cohesion using Equation 6. It then applies the filtering rule of Equation 7 on the new $N_2$ update events captured at time T. The output of the novelty filter 410 is $C_{W''}^{nov}$ 408 which is then used to derive the observed novelty update rate λ 440 at time T, which is combined 450 with the history learned rate ($\lambda_C^{now}(T_{prev})$) 409 according to the adaptive rules of Equation 5, where $C_{W''} \leftarrow C_{W''}^{nov}$. This provides the current monitoring rate $\lambda_C^{nov}(T)$ 460 which is also returned 411 to the history component 420.

It is worth noting that by using this on-line scheme the expensive complexity in maintaining channel cohesion is reduced, where only the current buffer of captured events is considered in $[T_{prev}, T]$ for novelty detection filtering.

Performance Analysis

A performance analysis study carried out provides empirical evidence that using the proposed content-based scheme compared to the content-free scheme can maintain high quality channel profiles with a significant savings in the number of probes required for this task. For example, the proposed content-based scheme reduces the number of times it probes channels by 50% while losing no more than 5% in quality.

For this purpose a simulation using a set of Web feeds was carried out. Each feed was monitored twice, once using the content-free monitoring scheme and once using the content-based monitoring scheme. The quality obtained was measured by applying each monitoring scheme on each feed according to Equation. 4. In addition, the total number of probes was recorded by monitoring each feed according to each scheme. Using these two measures it was further calculated for each feed the ratio of quality loss and probe cutoff (gain) between the two monitoring schemes as follows. Given a feed $C \in C$, let Q(C, free) and K(C, free) denote the quality and number of probes of the content-free scheme, and let Q(C, content) and K(C, content) denote the quality and number of probes of the content-based scheme. Then calculate the quality loss as $$Q_{loss}(C) = 1 - \frac{Q(C, \text{content})}{Q(C, \text{free})} \text{ and probe cutoff as}$$

$$K_{cutoff}(C) = \frac{K(C, \text{free})}{K(C, \text{content})} - 1.$$

Novelty Filtering Threshold Analysis

The effect of the filtering threshold β on profile quality was first studied. It was observed that increasing β increases the average quality per channel (feed). Obviously, larger β values imply that more events are considered novel and thus the corresponding monitoring rate is larger and increases quality. Moreover, for $\beta \geq 0.1$ the average quality among the different monitored channels is at least 95% from optimal. Finally, the 98-percentile curve of the channel profiles quality shows that for $\beta \geq 0.25$ at least 98% of the monitored channels have at least 95% of the optimal profile quality.

Using the same off-line case, the novelty detection scheme's trade-off between monitoring quality and saving monitoring resources has further been explored. The relative cutoff was measured in the number of probes compared to the loss in quality resulting from the cutoff. It has been shown that a small loss in quality compared to significantly fewer probes for reasonable $\beta$ values. For instance, for $\beta=0.1$, 5% in average profile quality was lost while cutting down a third of the probes (50% gain).

Profile Window Size Analysis

The effect of the profile window size Win terms of the number of update events is considered for profile calculation on the quality-budget trade-off in the on-line monitoring setting. In this experiment, the threshold parameter is fixed $\beta=0.1$ that was learned in the off-line analysis.

It was observed that the quality loss is directly affected by the profile window size W. As the window size increases, the profile provides a wider perspective of the channel and therefore there is less chance of missing update events and deviating from the optimal profile; hence the quality loss is reduced.

Using the evaluation results presented in this section it is concluded that the monitoring scheme based on novelty detection indeed provides better utilization of the monitoring budget while producing high quality channel profiles. This observation will be supported in the next section that further explores the multi-channel monitoring case.

Multi-Channel Monitoring

A monitoring policy is allowed to monitor at most M channels in parallel. Thus, the profile quality obtained for multi-channel monitoring depends on the policy's on-line decisions of which channels to monitor over time. In the following a simple classification scheme for multi-channel monitoring policies is introduced. Inter-channel profile similarities are also introduced as a means of further refining the monitoring rates. Finally, an empirical evaluation study is discussed on the performance of these policies Monitoring Policies The importance of a channel is defined during time to be relative to its monitoring rate, as derived by the learning scheme presented previously. A channel with higher monitoring rate is considered more important. Note that the relative importance of a channel is changed dynamically over time according to the change in the derived monitoring rate.

The monitoring policies can be classified according to two main properties. The first property classifies the policies as either greedy or fair. A greedy monitoring policy monitors the most M important channels at any moment in time. It is worth noting that policies assume the availability of a given update model, while the present method learns the model on-line. Furthermore, it is noted that the described monitoring rate learning methods can be easily integrated with any other monitoring solution that requires an update model as input. Therefore, the analysis for the multi-channel case also provides a proof of concept for the ease of usage of the described methods by a wide range of other possible monitoring policies. A fair policy, on the other hand, selects M channels at random, according to the distribution induced by the channel relative importance values.

The second property relates to the policy attention to the content of the update events. A policy that ignores content is termed a content-free policy while a policy that considers content is termed a content-based policy. When the content is ignored, the monitoring rates are learned as described in Equation 5. When the content is also considered, the monitoring rate of each channel is calculated using the novelty detection filter. Since the monitoring rates of the channels determine their relative importance, a certain channel might have different importance values under content-free or content-based policies, due to the difference in monitoring rates.

Based on the classification described above, experiments have been made with four policy types: content-free (greedy), content-free (fair), content-based (greedy), and content-based (fair). The four policy types represent a wide range of possible policies for multi-channel monitoring.

Using Inter-Channel Profile Similarities for Refining Channel Monitoring Rates

A regularization scheme is proposed that can be used to further refine the channel monitoring rates based on inter-channel profile similarities. Using this scheme, a channel's monitoring rate can be refined according to its profile similarity to other channels' profiles without actually having to probe that channel. For example, suppose a channel's profile has high similarity with the profile of another channel that has just been monitored (and therefore, its monitoring rate has been updated). Therefore, an increase in the last channel's monitoring rate will cause an increase in the first channel's monitoring rate as well.

For this propose we maintain an n×n similarity matrix S, where a matrix entry $S_{i,j}$ corresponds to the average profile similarity between channel $C_i$ profile and channel $C_j$ profile during a given time period T, which is calculated as follows:

$$S_{i,j} = \frac{1}{|T|} \int_T sim(P(C_{i,T}), P(C_{j,T})) dT \qquad (9)$$

Every row i of matrix S is normalized by dividing each entry $S_{i,j}$ by the total sum of values on that row. A definition is provided of the relationship between each pair of Web feeds as was determined by a human assessment, either an inclusion (denoted $C_1 \sim C_2$) or a similarity (denoted $C_1 \subset C_2$). For example, the content published on the NY-TIMES.TECHNOLOGY.Circuits Web feed is almost completely contained in the content that is published on the NY-TIMES.TECHNOLOGY Web feed (resulting in very high profile similarity).

How the similarity matrix S is used to refine the monitoring rates is now discussed. Let $\vec{\lambda}_C(T) = (\lambda_{C_1}, \lambda_{C_2}, \ldots, \lambda_{C_n})$ denote a vector of channel monitoring rates at time T, and let $S^{norm}(T)$ denote the normalized similarity matrix as calculated at time T.

Then refine the monitoring rates as follows:

$$\vec{\lambda}_{C'}(T) = S^{norm}(T) \times \vec{\lambda}_C(T) \qquad (10)$$

It is worth noting that a channel $C_i$ whose profile is not similar to any of the other channel profiles will have $S_{i,j \neq i}^{norm} = 0$ and $S_{i,i}^{norm} = 1$, and therefore, after applying Equation. 10 its monitoring rate will remain unchangeable and depend solely on the channel's own update events (content). Otherwise, the channel shares some profile similarity with other channels in the system and therefore its monitoring rate is determined by the relative similarity its profile has with the other channel profiles and the current channel monitoring rates. As is shown later, such refinement can further improve the quality of maintained channel profiles.

Evaluation

An empirical evaluation has been carried out of the different policies that have been proposed in the monitoring policies using varied parameter settings. In general, the two content-based policies dominated their content-free counterparts. It is show that the monitoring rates refinement scheme of inter-channel profile similarities can further help to improve the performance.

Content-Based Versus Content-Free

Figure 5:
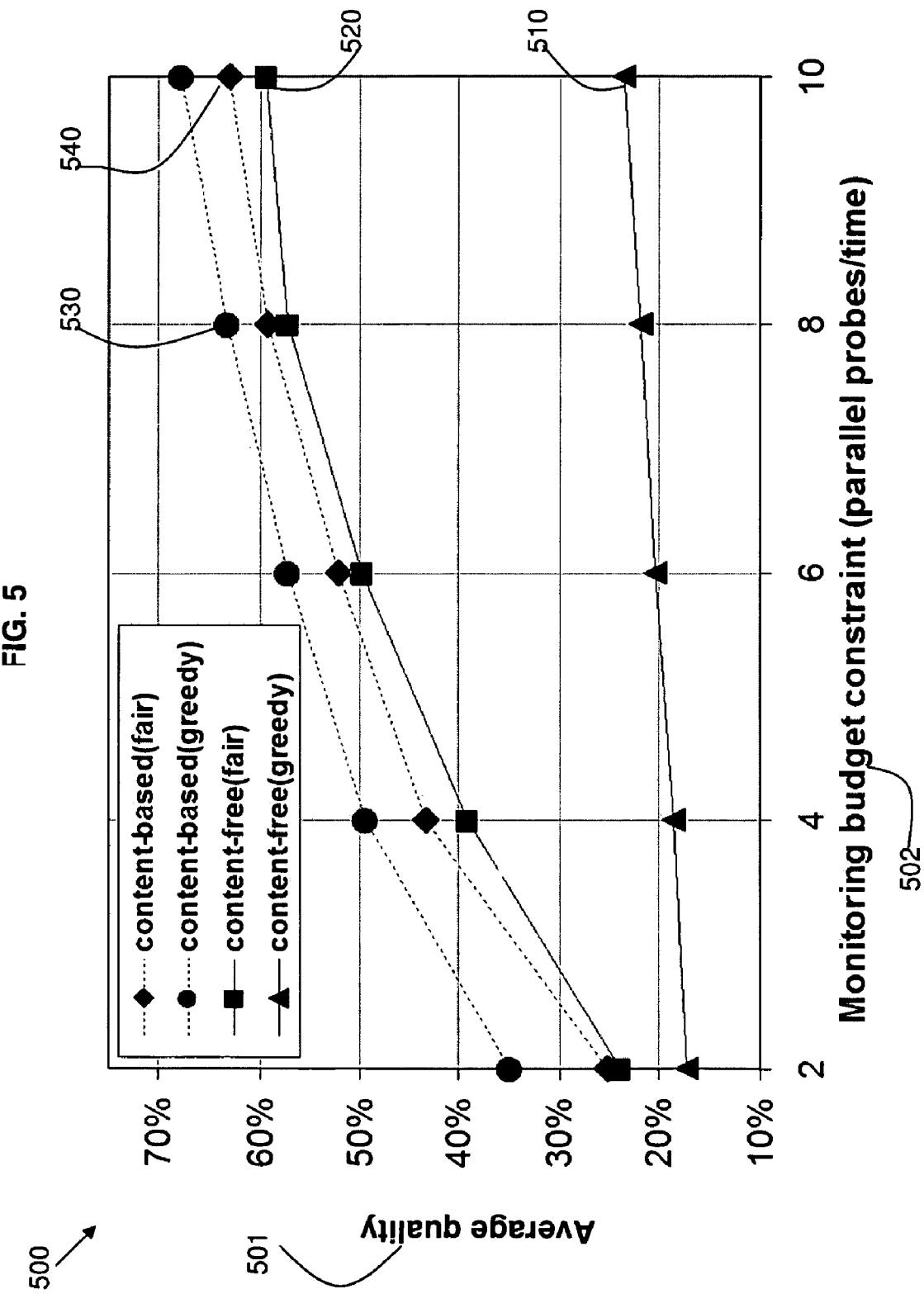
FIG. 5 is a graph showing the results of methods according to aspects of the present invention.

FIG. 5 shows a graph 500 of the results of a simulation conducted monitoring a set of 132 channels while using different monitoring budgets (i.e., different M values). The graph 500 shows the average profile quality 501 obtained by the different policies for different M values 502. The two content-free policies 510, 520 are represented by complete lines with the greedy content-free policy 510 having triangle marks and the fair content-free policy having square marks. The two content-based policies 530, 540 are represented by dashed lines with the greedy content-based policy 530 having circle marks, and the fair content-based policy 540 having diamond marks. The profile window size was fixed to be W=20 and further fixed $\beta$=0 as the novelty filtering threshold for the content based policies.

The obvious observation from FIG. 5 is that the quality obtained by the policies increases as the monitoring budget increases. Furthermore, the empirical results reveal two interesting observations. First, both content-based policies 530, 540 dominate the content-free policies 510, 520 at every budget level. These results support the empirical observations made on single channel monitoring. The results further suggest that considering the content for the derivation of channel monitoring rates and using them to determine the relative channel importance can improve the quality obtained by content-based policies.

Second, it is observed that while fairness provides better quality over greediness for the content-free policies, this is not the same for the content-based policies. The content-based (greedy) policy 530 dominates the other three policies. This observation implies that when content is not considered, it is preferable to fairly share the budget between the different channels and avoid making local greedy decisions. On the other hand, these results further imply that content-based policies may benefit from some greedy decisions when the budget is spread more efficiently among the different channels. Nevertheless, fairness might still be the preferred choice, for example when the policy monitors channels where most of them have high novel content rates.

To explore the effect of profile window size on the four different policies the monitoring budget was fixed to be M=6 and the simulation run using different profile window size (W) values. It was observed that as the profile window size is increased, the quality obtained by all four policies is improved; yet again, with less remarkable improvement for the content-free (greedy) policy. It is also observed that the two content-based policies still dominate the two other content-free policies, and manage to better utilize the monitoring budget for every profile window size. Overall the two content-based policies show almost similar performance, suggesting that any type of content-based policy, whether fair, greedy, or in between, may achieve better performance than any possible content-free policy.

The effect of the novelty filtering threshold $\beta$ on the performance of the two content-based policies was also evaluated. Again the monitoring budget was fixed to M=6 and fixed the profile window size to W=20. As $\beta$ values increase, less update events get filtered and the two content-based policies behave differently. For $\beta \leq 0$ (more novelty filtering) it is observed that overall the two policies keep their same performance level, where the greedy policy further dominates the fair policy. On the other hand, for $\beta$>0 (less novelty filtering) it is observed that the two policies show opposite trends. While the fair policy remains quite robust and even improves slightly with the increase in the filtering threshold, the greedy policy performance completely deteriorates, almost to the level of quality obtained by its content-free counterpart greedy policy.

This can be explained as follows: as less update events are filtered, the monitoring rates are less affected by the novelty filter and the two policies behave similarly to their content-free counterpart policies. Therefore, the content-based (fair) policy dominates the content-based (greedy) policy in a similar way the content-free (fair) dominates the content-free (greedy) policy in FIG. 5.

To conclude, overall, the simulation results clearly show that taking content into consideration, by the multi-channel monitoring policies, improves the overall obtained quality of the channel profiles.

Utilizing Inter-Channel Profile Similarities

Finally, the inter-channel profile similarities refinement scheme was evaluated. For this purpose the content-based (fair) policy was experimented with using different levels of novelty filtering thresholds ($\beta$). For $\beta$>0, the content-based (fair) policy dominates the content-based (greedy) policy, and therefore, an aim is to improve its performance furthermore by utilizing inter-channel profile similarities.

It is observed, that in general, the refinement scheme manages to improve the baseline performance of the policy for all budget levels, where the highest improvement is by 15%. Furthermore, it is observed that the improvement is much better when mild novelty filtering is used ($\beta$=0.2). To explain, a more aggressive novelty filtering may result in lower inter-channel profile similarities, and therefore, a channel's monitoring rate is less effected by the other channels' monitoring rates.

It is concluded, that indeed, inter-channel profile similarities can be efficiently utilized to further refine the channel monitoring rates and improve the overall performance.

Summary

Some measures of profile monitoring quality have been described. Using these measures, it is demonstrated the necessity for methods for maintaining channel profiles. Both off-line and on-line monitoring cases are discussed and the challenges in monitoring profiles on-line. For the on-line case, a monitoring scheme is proposed based on reinforcement learning for the derivation of channel monitoring rates. An extension of this monitoring scheme is further presented by considering the content that is published on the channel. A novelty detection filter is proposed that refines the monitoring rate according to the rate at which novelty content is expected to be produced on the channel. It is also demonstrated how inter-channel profile similarities can be utilized to refine more the monitoring rates.

Using real-world data of Web feeds, the performance of the on-line monitoring scheme has been studied for single and multi-channel monitoring. The empirical study showed that the monitoring rates learning, combined with the on-line novelty detection, can guarantee high quality channel profiles, while significantly cutting down the monitoring budget which in turn improve the overall performance. Finally, it was showed that inter-channel profile similarities can be utilized to improve more the performance.

A profile management system may be provided as a service to a client over a network.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

We claim:

1. A method for maintaining profiles of information channels, wherein the information channels are accessed via pull-only protocols, the method comprising:
    monitoring one or more channels on a data network by a channel pull action at a monitoring rate,
    determining novel update events in respective ones of the one or more channels during an epoch, by filtering update events occurring during the epoch, wherein filtering comprises disregarding ones of the update events that do not include significant novel information;
    adapting the monitoring rate responsively to a number of the novel update events in subsequent epochs by iteratively applying reinforcement learning rules, wherein the learning rules comprise a first parameter that controls a tradeoff between an exploration of an observed monitoring rate and an exploitation of a history of the monitoring rate and a second parameter that controls a rate of learning, wherein the learning rules comprise formulas:

$$\lambda_C^{on}(T) = \alpha_T \cdot \lambda_C^{on}(T_{prev}) + (1 - \alpha_T) \cdot \frac{|C_{W'}|}{|W'|}$$

$$\alpha_T = \alpha_0 \cdot \exp{\frac{-T}{G}},$$

wherein
    $T_{prev}$ is the previous time epoch;
    $\lambda_C^{on}$ is the monitoring rate;
    T is a time epoch;
    $C_{W'}$ is a set of captured update events between two consecutive polls of channel C occurring between times $T_{prev}$ and T;
    $\alpha_T$ is learning parameter; and
    G is a parameter that controls the rate of learning; and
    recording the novel update events in the history in respective channel profiles of the one or more channels, wherein the channel profiles represent dynamic textual content of the channels.

2. The method according to claim 1, wherein filtering comprises determining if the update events include significant novel information by evaluating respective influences of the update events on channel cohesion, and disregarding ones of the update events that exceed a threshold parameter of similarity to an information channel's current profile.

3. The method according to claim 1, wherein monitoring one or more channels is performed by monitoring multiple channels, further comprising the steps of:
    measuring inter-channel profile similarities of the multiple channels; and
    further adapting the respective monitoring rates of the multiple channels responsively to the inter-channel profile similarities thereof.

4. The method according to claim 3, wherein measuring inter-channel profile similarities of the multiple channels comprises determining vector space model cosine similarities thereof.

5. The method according to claim 3, wherein measuring inter-channel profile similarities of the multiple channels comprises maintaining a similarity matrix having entries corresponding to an average profile similarity between two of the channels during a given time period, the similarity matrix being calculated by a formula:

$$S_{i,j} = \frac{1}{|T|} \int_T sim(P(C_{i,T}), P(C_{j,T})) \, dT,$$

wherein $P(C_{i,T})$ and $P(C_{i,T})$ are channel profiles during a time period T.

6. The method according to claim 3, wherein monitoring multiple channels comprises monitoring an M most important channels at any moment in time, wherein an importance of a channel is determined according to the monitoring rate thereof.

7. The method according to claim 3, wherein monitoring multiple channels comprises monitoring M randomly selected ones of the channels at any moment in time.

8. The method according to claim 1, further comprising varying a length of the subsequent epochs in which the update events are monitored so as to optimize a quality of results against resource use.

9. A computer software product for maintaining profiles of information channels, including a computer-readable storage medium in which computer program instructions are stored, which instructions, when executed by a computer, cause the computer to perform a method comprising the steps of:
    monitoring one or more channels on a data network by a channel pull action at a monitoring rate,
    determining novel update events in respective ones of the one or more channels during an epoch, by filtering update events occurring during the epoch, wherein filtering comprises disregarding ones of the update events that do not include significant novel information;
    adapting the monitoring rate responsively to a number of the novel update events in subsequent epochs by iteratively applying reinforcement learning rules, wherein the learning rules comprise a first parameter that controls a tradeoff between an exploration of an observed monitoring rate and an exploitation of a history of the monitoring rate and a second parameter that controls a rate of learning; wherein the learning rules comprise formulas:)

$$\lambda_C^{on}(T) = \alpha_T \cdot \lambda_C^{on}(T_{prev}) + (1 - \alpha_T) \cdot \frac{|C_{W'}|}{|W'|}$$

$$\alpha_T = \alpha_0 \cdot \exp\frac{-T}{G},$$

wherein $T_{prev}$ is the previous time epoch;
$\lambda_C^{on}$ is the monitoring rate;
T is a time epoch;
$C_{W'}$ is a set of captured update events between two consecutive polls of channel C occurring between times $T_{prev}$ and T;
$\alpha_T$ is a learning parameter; and
G is a parameter that controls the rate of learning; and
recording the novel update events in the history in respective channel profiles of the one or more channels, wherein the channel profiles represent dynamic textual content of the channels.

10. The computer software product according to claim 9, wherein monitoring one or more channels is performed by monitoring multiple channels, further comprising the steps of:
measuring inter-channel profile similarities of the multiple channels; and
further adapting the respective monitoring rates of the multiple channels responsively to the inter-channel profile similarities thereof.

11. The computer software product according to claim 10, wherein measuring inter-channel profile similarities of the multiple channels comprises determining vector space model cosine similarities thereof.

12. The computer software product according to claim 10, wherein measuring inter-channel profile similarities of the multiple channels comprises maintaining a similarity matrix having entries corresponding to an average profile similarity between two of the channels during a given time period, the similarity matrix being calculated by a formula:

$$S_{i,j} = \frac{1}{|T|} \int_T sim(P(C_{i,T}), P(C_{j,T})) dT,$$

wherein $P(C_{i,T})$ and $P(C_{j,T})$ are channel profiles during a time period T.

13. A data processing system for maintaining profiles of information channels, comprising: a processor; a pull protocol adapter linked to the processor; a memory accessible to the processor storing programs and data objects therein, the programs including profile management software, wherein execution of the programs causes the processor to perform a method comprising the steps of:
monitoring one or more channels on a data network by a channel pull action via the pull protocol adapter at a monitoring rate,
determining novel update events in respective ones of the one or more channels during an epoch, by filtering update events occurring during the epoch, wherein filtering comprises disregarding ones of the update events that do not include significant novel information;
adapting the monitoring rate responsively to a number of the novel update events in subsequent epochs by iteratively applying reinforcement learning rules, wherein the learning rules comprise a first parameter that controls a tradeoff between an exploration of an observed monitoring rate and an exploitation of a history of the monitoring rate and a second parameter that controls a rate of learning; wherein the learning rules comprise formulas:

$$\lambda_C^{on}(T) = \alpha_T \cdot \lambda_C^{on}(T_{prev}) + (1 - \alpha_T) \cdot \frac{|C_{W'}|}{|W'|}$$

$$\alpha_T = \alpha_0 \cdot \exp\frac{-T}{G},$$

wherein $T_{prev}$ is the previous time epoch;
$\lambda_C^{on}$ is the monitoring rate;
T is a time epoch;
$C_{W'}$ is a set of captured update events between two consecutive polls of channel C occurring between times $T_{prev}$ and T;
$\alpha_T$ is a learning parameter; and
G is a parameter that controls the rate of learning; and
recording the novel update events in the history in respective channel profiles of the one or more channels, wherein the channel profiles represent dynamic textual content of the channels.

14. The data processing system according to claim 13, wherein monitoring one or more channels is performed by monitoring multiple channels, further comprising the steps of:
measuring inter-channel profile similarities of the multiple channels; and
further adapting the respective monitoring rates of the multiple channels responsively to the inter-channel profile similarities thereof.

15. The data processing system according to claim 14, wherein measuring inter-channel profile similarities of the multiple channels comprises maintaining a similarity matrix having entries corresponding to an average profile similarity between two of the channels during a given time period, the similarity matrix being calculated by a formula:

$$S_{i,j} = \frac{1}{|T|} \int_T sim(P(C_{i,T}), P(C_{j,T})) dT,$$

wherein $P(C_{i,T})$ and $P(C_{j,T})$ are channel profiles during a time period T.

16. The data processing system according to claim 13, execution of the programs causes the processor to vary a length of the subsequent epochs in which the update events are monitored so as to optimize a quality of results against resource use.

17. A method for maintaining profiles of information channels, wherein the information channels are accessed via pull-only protocols, the method comprising:
monitoring a plurality of channels on a data network by a channel pull action at respective monitoring rates,
measuring inter-channel profile similarities of the plurality of channels by calculating vector space model cosine similarities thereof;
maintaining a similarity matrix of inter-channel profile similarities, the similarity matrix having entries corresponding to an average inter-channel profile similarity between two of the channels during a given time period, the similarity matrix being calculated by a formula:

$$S_{i,j} = \frac{1}{|T|} \int_T sim(P(C_{i,T}), P(C_{j,T})) dT,$$

wherein $P(C_{i,T})$ and $P(C_{j,T})$ are two channel profiles of the plurality of channels during a time period T, and $Sim(C_{i,T}), C_{j,T}$ are the vector space model cosine similarities between the two channel profiles;

adapting the monitoring rates responsively to the inter-channel profile similarities in subsequent time periods by iteratively applying reinforcement learning rules; and recording novel update events in respective channel profiles of the plurality of channels, wherein the respective channel profiles represent dynamic textual content of the channels.

18. The method according to claim 17, wherein the learning rules comprise a learning formula:

$$\vec{\lambda}'_C(T) = S^{norm}(T) \times \vec{\lambda}_C(T),$$

wherein $\vec{\lambda}_C(T)$ is a vector of channel monitoring rates; and $S^{norm}(T)$ is a normalized similarity matrix at the time period T.

* * * * *